(12) United States Patent
Curry et al.

(10) Patent No.: US 10,156,467 B2
(45) Date of Patent: Dec. 18, 2018

(54) VISUAL LIQUID LEVEL INDICATOR

(71) Applicant: Gems Sensors Inc., Plainville, CT (US)

(72) Inventors: David P. Curry, Bristol, CT (US); Douglas Stetson, Bristol, CT (US); James B. Dockendorff, North Haven, CT (US)

(73) Assignee: GEMS SENSORS INC., Plainville, CT (US)

( * ) Notice: Subject to any disclaimer, the term of this patent is extended or adjusted under 35 U.S.C. 154(b) by 0 days.

(21) Appl. No.: 15/356,024

(22) Filed: Nov. 18, 2016

(65) Prior Publication Data
US 2017/0138780 A1    May 18, 2017

Related U.S. Application Data

(60) Provisional application No. 62/256,925, filed on Nov. 18, 2015.

(51) Int. Cl.
*G01F 23/64* (2006.01)
*G01F 23/00* (2006.01)
*G01F 23/02* (2006.01)

(52) U.S. Cl.
CPC .......... *G01F 23/64* (2013.01); *G01F 23/0046* (2013.01); *G01F 23/02* (2013.01)

(58) Field of Classification Search
CPC .......... G01F 23/66; G01F 23/72; G01F 23/02; G01F 23/74; G01F 23/38; G01F 23/64
See application file for complete search history.

(56) References Cited

U.S. PATENT DOCUMENTS

| | | | | |
|---|---|---|---|---|
| 2,720,785 A | * | 10/1955 | Sedgwick | G01F 23/68 324/204 |
| 2,920,484 A | * | 1/1960 | Reichert | G01F 23/66 324/67 |
| 2,934,953 A | * | 5/1960 | Anderson | G01F 23/66 73/319 |
| 3,548,659 A | | 12/1970 | Ellis | |
| 3,964,312 A | * | 6/1976 | Sebek | G01F 23/66 73/307 |
| 4,194,397 A | * | 3/1980 | Yasuda | G01F 23/66 73/314 |
| 4,457,171 A | | 7/1984 | Gebauer | |
| 4,512,190 A | | 4/1985 | Sledmere | |
| 4,749,988 A | * | 6/1988 | Berman | G01F 23/268 340/618 |

(Continued)

FOREIGN PATENT DOCUMENTS

JP    2006-208141 A    8/2006

OTHER PUBLICATIONS

International Search Report and Written Opinion for Application No. PCT/US2016/062934 dated Feb. 14, 2017.

*Primary Examiner* — David A Rogers
(74) *Attorney, Agent, or Firm* — Nelson Mullins Riley & Scarborough LLP

(57) ABSTRACT

A tank and liquid level indicator has first housing that holds a liquid and a second elongated housing in fluid communication with the first elongated housing so that a liquid level in the second housing is approximately equal to the level in the first housing. A float in the second housing cooperates with the circuitry to operate one or more light switches. A light-transmissive cover is disposed over the light source.

21 Claims, 8 Drawing Sheets

(56) References Cited

U.S. PATENT DOCUMENTS

| | | | | |
|---|---|---|---|---|
| 4,922,764 A * | 5/1990 | Welker | ............... | B01F 13/0016 |
| | | | | 73/863 |
| 5,988,701 A * | 11/1999 | Wu | ............... | G01F 23/74 |
| | | | | 285/197 |
| 6,253,611 B1 * | 7/2001 | Varga | ............... | G01F 23/72 |
| | | | | 73/319 |
| 6,435,026 B1 * | 8/2002 | Donehue | ............... | G01F 23/74 |
| | | | | 73/314 |
| 6,474,158 B2 * | 11/2002 | Czarnek | ............... | G01D 5/2046 |
| | | | | 73/305 |
| 6,588,272 B2 * | 7/2003 | Mulrooney | ............... | G01F 23/263 |
| | | | | 116/204 |
| 6,964,278 B2 * | 11/2005 | Tschanz | ............... | G01F 23/02 |
| | | | | 137/386 |
| 7,703,321 B2 * | 4/2010 | Hell | ............... | G01F 23/74 |
| | | | | 73/290 R |
| 8,584,705 B2 * | 11/2013 | Hughes | ............... | F16K 5/0207 |
| | | | | 137/269.5 |
| 8,933,810 B1 * | 1/2015 | Donehue | ............... | G01F 23/0046 |
| | | | | 340/618 |
| 9,134,162 B2 * | 9/2015 | Taylor | ............... | G01F 23/02 |
| 9,557,205 B2 * | 1/2017 | Sanders | ............... | G01F 23/02 |
| 9,638,565 B2 * | 5/2017 | Carlson | ............... | G01F 23/0046 |
| 9,709,434 B1 * | 7/2017 | Harper | ............... | G01F 23/66 |
| 2003/0037613 A1 * | 2/2003 | Mulrooney | ............... | G01F 23/263 |
| | | | | 73/323 |
| 2005/0056092 A1 * | 3/2005 | Kowalski | ............... | G01F 23/74 |
| | | | | 73/313 |
| 2005/0109105 A1 | 5/2005 | Kowalski et al. | | |
| 2005/0229974 A1 * | 10/2005 | Tschanz | ............... | G01F 23/02 |
| | | | | 137/386 |
| 2009/0013781 A1 * | 1/2009 | Hettinga | ............... | G01F 23/02 |
| | | | | 73/323 |
| 2009/0056438 A1 * | 3/2009 | Hughes | ............... | G01F 23/02 |
| | | | | 73/323 |
| 2011/0011891 A9 * | 1/2011 | Hettinga | ............... | B67D 1/0406 |
| | | | | 222/155 |
| 2014/0318480 A1 * | 10/2014 | Liu | ............... | G01F 23/62 |
| | | | | 122/504.2 |
| 2015/0253179 A1 * | 9/2015 | Carlson | ............... | G01F 23/72 |
| | | | | 116/204 |

\* cited by examiner

VISUAL LIQUID LEVEL INDICATOR

CROSS REFERENCE TO RELATED APPLICATION

The present application claims priority to U.S. provisional patent application Ser. No. 62/256,925, filed Nov. 18, 2015, entitled VISUAL LIQUID LEVEL INDICATOR, the entire disclosure of which is hereby incorporated by reference herein.

FIELD OF THE INVENTION

The present invention relates generally to level indicators and, more particularly, to an indicator for a level of fluid in a storage tank or vessel.

BACKGROUND OF THE INVENTION

Easy to view liquid level indication devices that are both accurate and nearly indestructible are known in the art. For example, liquid level indicators sold under the name SURESITE by GEMS Sensors, Inc. of Plainville, Conn. are available for use in applications where quick visual communication of tank contents is required. Such indicators operate without power in temperatures to 750° F. (399° C.) and in pressures up to 4200 psi (290 bar) and are unaffected by extreme thermal changes. In addition, sight glasses are available, although such devices are relatively more fragile and breakable.

Thus, SURESITE liquid level indicators are a durable and safer alternative to sight glasses. Each SURESITE indicator includes an alloy, stainless steel alloy, or engineered plastic housing and mounts externally to a top or side of a liquid storage tank to provide easy-to-read, continuous level gauging. A magnetic level indicator is isolated from the measured media in a pressure-tight housing, allowing the SURESITE indicator to be used in areas where the use of sight glasses may not be possible. The magnetic level indicator comprises a series of vertically-spaced flags each having first sides with a first color and second sides with a contrasting second color. A magnetic float traveling within a housing adjacent to the indicator sequentially flips each flag, thereby showing a series of flags with the first color facing outward a second series of flags with the second color facing outward, thereby indicating that the liquid level is approximately between the first and second series of flags. U.S. Pat. No. 4,512,190 discloses an early fluid level indicator of a similar embodiment. SURESITE indicators are unaffected by tank shape, condensation, atmospheres, foam, stratification of vapors, high temperatures, or flux and do not require continual calibration. Modular accessories, such as switches, scales, and continuous transmitters, increase capabilities.

However, known visual liquid level indicators are difficult to use in dark, tight, confined, or hard to reach locations. For example, known indicators provide far less utility when used in radiator cabinets, engine rooms, or open areas, such as oil storage tank fields, breweries, and dairy farms that use several tanks.

The accompanying drawings, which are incorporated in and constitute a part of this specification, illustrate one or more embodiments of the invention and, together with the description, serve to explain the principles of the invention.

SUMMARY OF THE INVENTION

The present invention recognizes and addresses considerations of prior art constructions and methods.

In one embodiment, a tank and liquid level indicator includes a first housing enclosing a first volume that holds a liquid and a second elongated housing enclosing a second volume, wherein the second housing is attached to an exterior of the first housing so that the second volume is in fluid communication with the first volume so that a level of the liquid within the second volume is approximately equal to a level of the liquid in the first volume. A float is disposed within the second volume and is buoyant with respect to the liquid so that the float moves with the level of the liquid in the second volume along a first axis passing through a center of the float. At least a portion of the float is magnetic so that a magnetic field extends from the float. A plurality of magnetic sensors are aligned sequentially with respect to each other in a direction having a vertical component. The magnetic sensors are disposed with respect to the second volume so that movement of the float within the second volume in response to the level of the liquid within the second volume causes sequential detection of the magnetic field by respective magnetic sensors of the plurality of sensors. At least one light source is in electrical communication with the plurality of magnetic sensors so that the magnetic sensors control actuation of the at least one light source in response to the detection of the magnetic field. A light-transmissive cover is attached to the second housing so that the at least one light source is disposed between the second housing and an outer surface of the light-transmissive cover. The outer surface is disposed on at least one side of a first plane that is parallel to the first axis and at an outer surface of the second housing and is disposed on an opposite side of the first axis from the first housing. The at least one light source is disposed with respect to the outer surface of the cover so that a first portion of light from the at least one light source passes through the first plane and a second portion of the light from the light source travels away from the plane.

In another embodiment, a tank and liquid level indicator has a first housing enclosing a first volume that holds a liquid. A second generally cylindrical housing has annular cross-sections and encloses a second volume. The second housing is attached to an exterior of the first housing so that the second volume is in fluid communication with the first volume so that a level of the liquid within the second volume is approximately equal to a level of the liquid in the first volume. A generally cylindrical float is disposed within the second volume and is buoyant with respect to the liquid so that the float moves with the level of the liquid in the second volume along a first axis passing through a center of the float. At least a portion of the float is magnetic so that a magnetic field extends from the float. A plurality of magnetic sensors is aligned sequentially with respect to each other in a direction having a vertical component. The magnetic sensors are disposed with respect to the second volume so that movement of the float within the second volume in response to the level of the liquid within the second volume causes sequential detection of the magnetic field by respective said magnetic sensors of the plurality of sensors. At least one light source is in electrical communication with the plurality of magnetic sensors so that the magnetic sensors control actuation of the at least one light source in response to the detection of the magnetic field. A light-transmissive cover is attached to the second housing so that the at least one light source is disposed between the second housing and an outer surface of the light-transmissive cover. The outer surface extends across and beyond both sides of a first plane that is parallel to the axis and tangential to an outer surface of the second housing, and the at least one light source is disposed on an opposite side of the first axis from the first housing. The at least one light source is disposed with respect to the outer surface of the cover so that light from the at least one light source passes through the first plane and away from the first plane.

The accompanying drawings, which are incorporated in and constitute a part of this specification, illustrate one or more embodiments of the invention and, together with the description, serve to explain one or more embodiments of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
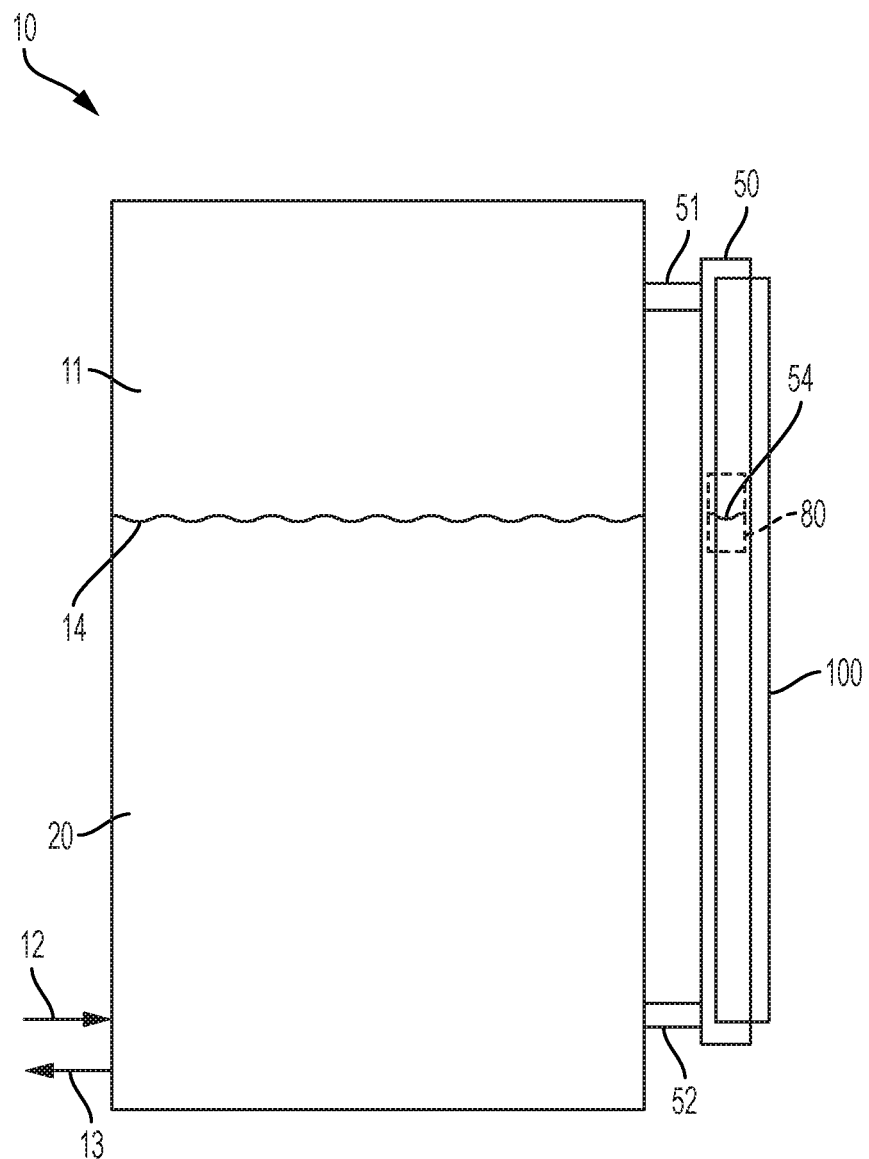
FIG. 1 is a schematic view of a tank and liquid level indicator in accordance with an embodiment of the present invention.

Repeat use of reference characters in the present specification and drawings is intended to represent same or analogous features or elements of the invention according to the disclosure.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the level indicator, such as but not limited to "vertical," "horizontal," "upper," "lower," "above," or "below," refer to directions and relative positions with respect to the level indicator's orientation in its normal intended operation, as indicated in FIG. 1 herein. Thus, for instance, the terms "vertical" and "upper" refer to the vertical direction and relative upper position in the perspectives of FIG. 1 and should be understood in that context, even with respect to a liquid level indicator that may be disposed in a different orientation.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

Referring now to FIG. 1, a tank 10 has an inlet 12 and outlet 13 for providing a liquid 20 with an ingress and an egress, respectively, to an interior volume 11 of tank, or housing, 10. Tank 10 may be made of a suitable material, such as a stainless steel, a unitary polymer, a layered polymer composite, a reinforced composite polymer, or a suitable metal. Tank 10 fluidly couples with a nonmagnetic elongated housing 50 extending vertically along tank 10 that is in fluid communication with interior volume 11 of tank 10 via an upper conduit 51 and a lower conduit 52 so that a liquid level 14 within tank 10 is approximately equal to a liquid level 54 within the housing. Conduits 51, 52 couple with tank 10 through process ports via adapters such as, for example, nipples or flanges. For example, a tank having a pair of process ports with flanges may couple with housing 50 via matching flanges that attach via bolts to the tank's flanges.

Figure 2:
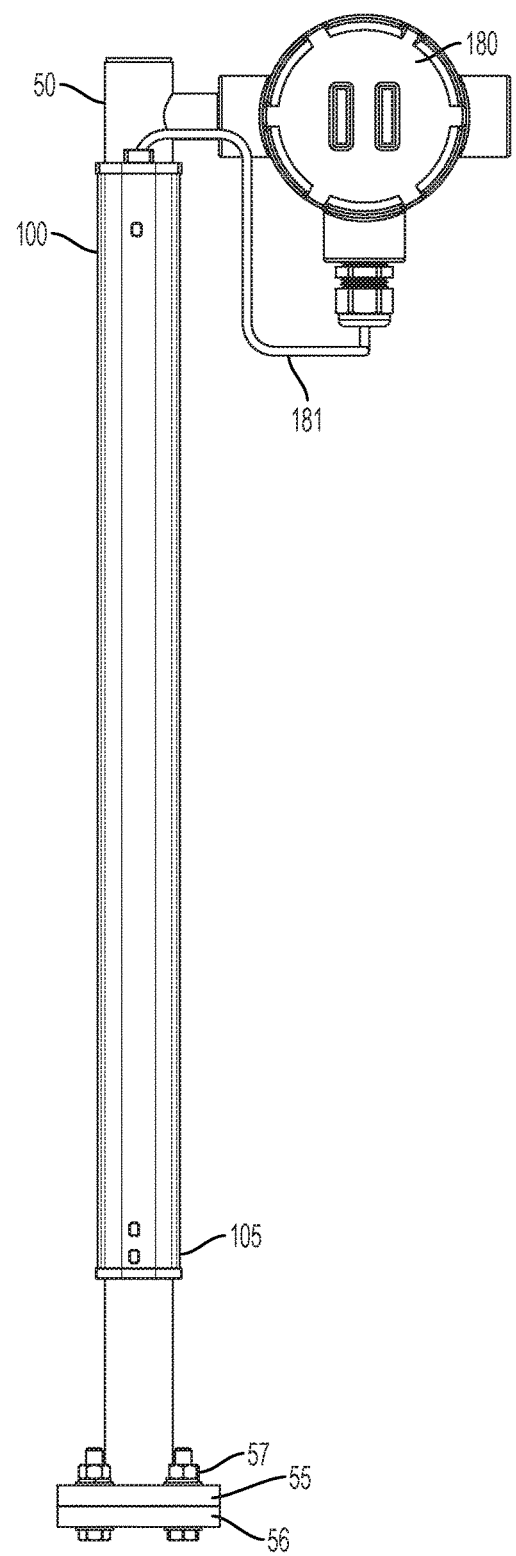
FIG. 2 is a plan view of the liquid level indicator of FIG. 1.

Referring to FIG. 2, elongated housing 50 has a hollow generally cylindrical profile and is fabricated in part from a tube having its top end capped and welded shut. Housing 50 has a bottom flange 55 that mates with a sealing plate 56 via nuts and bolts, or collectively, fasteners 57. A gasket is placed between flange 55 and plate 56 to seal housing 50 from leaks. By removing sealing plate 56, an access to housing 50 is exposed through which a float 80 (FIG. 1) is inserted into the interior of housing 50. Conduits 51, 52 (FIG. 1) are welded to a side of housing 50 at openings to housing 50's interior. Thus, the only inlets and outlets of housing 50 are conduits 51 and 52.

Figure 3:
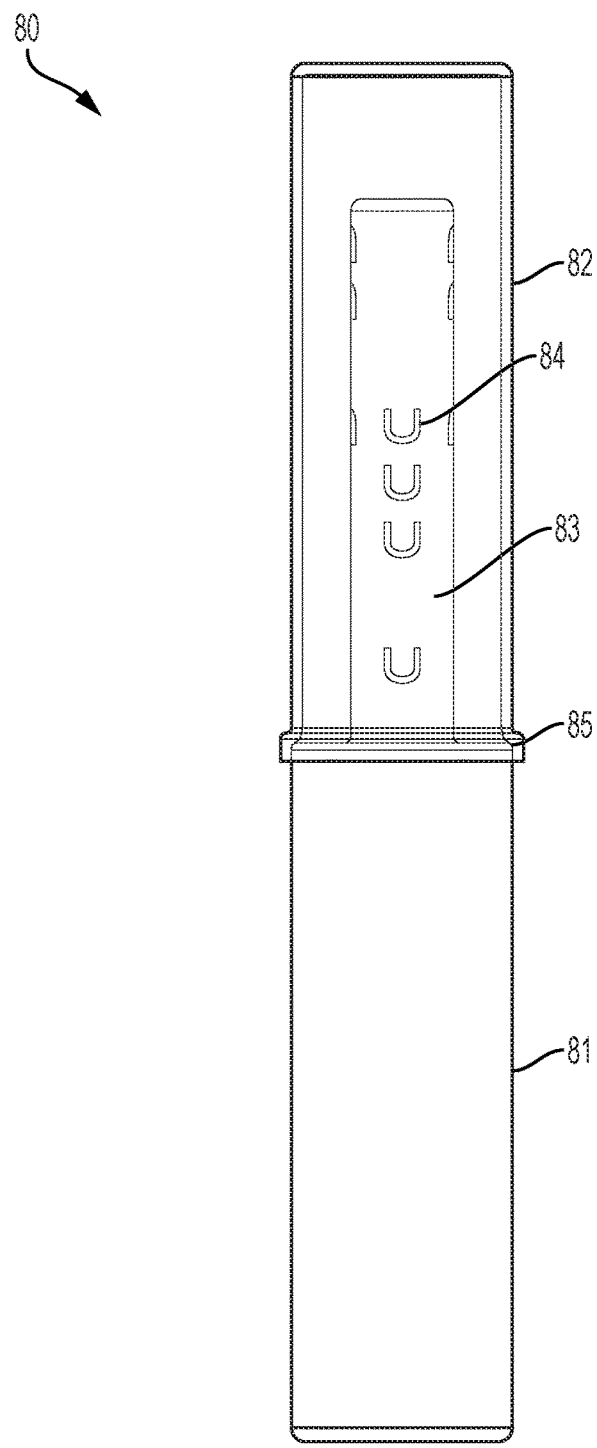
FIG. 3 is a schematic view of a float for use in the liquid level indicator of FIG. 1.

Float 80, illustrated in FIGS. 1 and 3, travels within an interior of housing 50 and has a dimension in housing 50's elongation direction that is greater than a major dimension of housing 50's cross section perpendicular to the elongation direction so that float 80 is held with a consistent vertical orientation and cannot rotate (other than a slight amount allowed by the tolerance between the float and the interior wall of housing 50 that allows relative movement between the two components) around an axis that is perpendicular to the elongation direction of housing 50. That is, a top of float 80 is fixed as the top and cannot rotate within housing 50 to become a bottom of float 80. In the illustrated embodiment, float 80 is generally cylindrical, having a height that is greater than housing 50's inner diameter. Moreover, float 80 fits within the interior of housing 50 with an outer diameter that is slightly less than housing 50's inner diameter so as to minimize rotation around an axis perpendicular to housing 50's elongation direction. Float 80 has an average density that is greater than the air in the tank but less than the liquid in the tank. In this way, float 80 is buoyant with respect to liquid 20 (FIG. 1) and will extend a relatively fixed amount below liquid level 14 (FIG. 1).

Referring now to FIG. 3, float 80 has an approximately cylindrical profile, having annular cross-sections and filleted upper and lower edges. Float 80 comprises a drawn nonmagnetic stainless steel cup-shaped bottom portion 81 and a drawn nonmagnetic stainless cup-shaped top portion 82. Top portion 82 is swaged to form a shoulder fabricated near its bottom edge having a larger inner diameter than bottom portion 81's outer diameter so that bottom portion 81 fits partially within top portion 82 to the depth of the shoulder.

Figure 8:
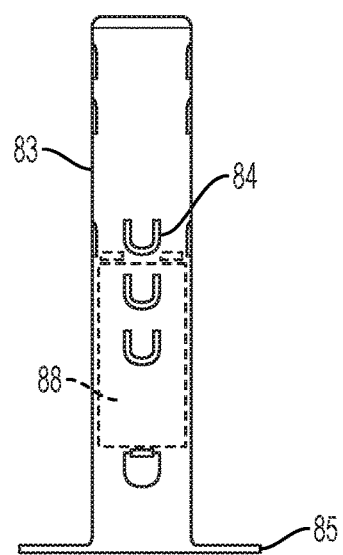
FIG. 8 is a partial view a magnet-holding portion of the float for use in the liquid level indicator of FIG. 1.

Referring also to FIG. 8, a magnet-holding inner portion 83 has a cylindrical and hollow elongated portion along the axis of float 80 (i.e. the vertical direction in FIG. 3) with a series of U-shaped slots cut or otherwise formed in the cylindrical side wall to form tabs 84 spaced vertically in pairs across opposite sides of the float (e.g., some of the tabs are on the left, and some are on the right, of the cylindrical portion in FIG. 8). Magnet-holding portion 83 has an opening on a bottom flanged side and is therefore configured to receive a cylindrical magnet 88 (having a diameter that is slightly less than the inner diameter of magnet portion 83 to enable insertion but limit movement in radial directions from the axis of magnetic portion 83). Once magnet 88 is inserted, opposing tabs 84 above and opposing tabs 84 below magnet 88 are bent inwards (a pair bending downwards and a pair bending upwards to fold against a top and a bottom of the magnet, respectively, so that two tabs fold against the top and two tabs fold against the bottom of the magnet) to hold magnet 88 in place along inner portion 83's axial direction. In this way, the magnet is inserted (with its north-south axis in the vertical direction of FIG. 3) into its location and held by bent tabs 84 in a fixed position with respect to the bottom of the float, the position determined based on the specific gravity of the liquid held in the tank so that the height of the magnet, when float 80 is floating on liquid 20, is at the same level as the liquid. Thus, by selecting a slot at a height above the bottom of float 80 that is equal to the depth into which float 80 extends into liquid 20, when float 80 is floating on liquid 20, the magnet is disposed at the level of liquid 20. For example, the lower the density of liquid 20, the lower float 80 will extend down into the liquid, so that a lower density liquid requires selection of a magnet slot higher up on float 80 than for a higher density liquid in order for the magnet to be held at the liquid level. In this way, float 80 is calibrated for the density of the particular liquid within tank 10. Inner portion 83 comprises a washer 85 or flanged portion that has approximately the same outer diameter as the outer diameter of bottom portion 81 so that washer 85 rests on top of bottom portion 81 and fits within the shoulder of top portion 82. Top portion 82 is placed over an outer radial edge of washer 85 and partially over bottom portion 81, and is then fusion-welded, creating a seal between bottom portion 81 and top portion 82, thereby trapping air within an interior of float 80. In this way, the average density of the air-filled stainless steel unit is less than a net density of its components.

Figure 4:
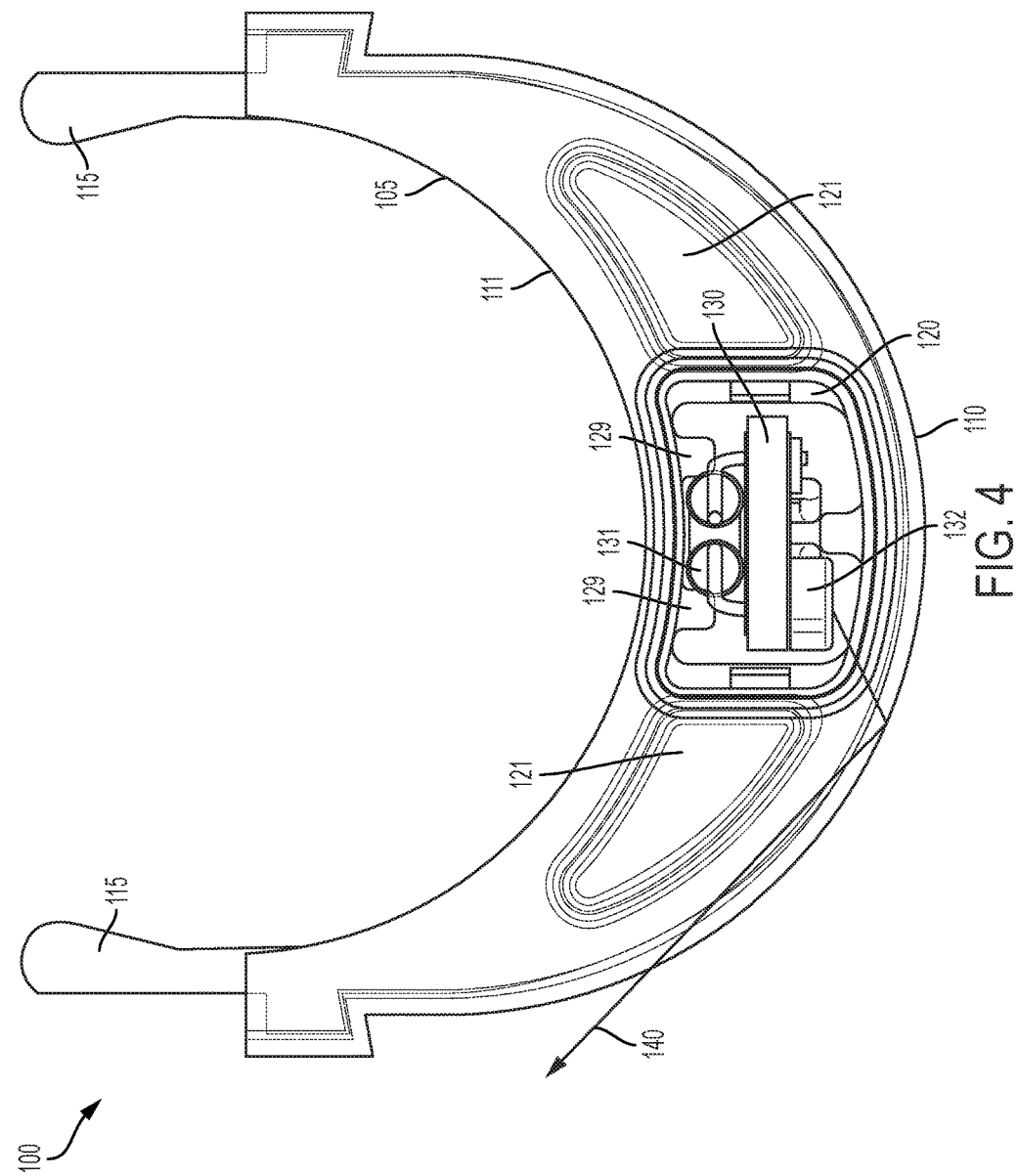
FIG. 4 is a partial top view of the liquid level indicator of FIG. 1.

Referring to FIG. 4, a visual indicator 100 clips to housing 50 (FIG. 1) as further discussed below. Visual indicator 100 comprises a shroud 105 comprising a light-transmissive (i.e. transparent or translucent) polymer, such as for example, polycarbonate, and has an elongated profile with consistent cross sections having an arcuate, and in this example on an approximately circular arc, outer edge 110 and an arcuate, and in this instance on an approximately circular arc, inner edge 111. Interior edge 111 has a radius at a center of curvature common with the center of curvature of housing 50's radiused outer surface so that when visual indicator 100 clips to housing 50, the indicator's inner surface sits approximately flush against housing 50's exterior surface. Visual indicator 100 further comprises tabs 115 that are an extension of shroud 105's profile. Tabs 115, comprised of a flexible polymer, deflect outward in order to allow visual indicator 100 to clip onto housing 50. Tabs 115 wrap around housing 50 greater than 180 degrees and have a radial distance to the center of inner edge 111 (when not attached to housing 50) that is less than the radius of housing 50's outer surface, so that tabs 115 bias inward and against housing 50, thereby enabling visual indicator 100 to hold to housing 50's exterior surface. Further, friction between shroud 105 and the outer surface of housing 50 prevents vertical sliding or rotation of shroud 105 along housing 50. In this way, visual indicator 100 is removably coupled to housing 50 so that it may be removed without breaking or damaging component parts or breaking a permanent adhesive and thus may be easily removed for repair or replacement. Alternatively, a very-high-bond double-sided adhesive tape or other adhesive may be used to hold visual indicator 100 to prevent vertical sliding or rotation around housing 50. Further benefits of visual indicator 100's clip on attachment include avoiding clamps that would otherwise obstruct visual indicator 100's viewing angle or require a higher profile.

Shroud 105 comprises two vertical through-channels 121 to minimize polymer volume, thereby reducing material costs and preventing cracking or other deformation from temperature changes during its manufacture and a third vertical through-channel 120 through which a printed circuit board (PCB) 130 extends. Extruded ridges 129 hold PCB 130 in a generally fixed location in all directions perpendicular to shroud 105's elongation direction. Extruded ridges 129 prevent PCB 130 from moving in a direction perpendicular to shroud 105's elongation direction within through-channel 120. A close fit between PCB 130 and channel 120 holds PCB 130 in a fixed location in shroud 105's elongation direction. In a further embodiment, a silicone gel is placed between PCB 130 and inner walls of channel 120, which further serves to fix PCB 130's location and protects the PCB from shock and vibration. Top and bottom caps (not shown) attach via an adhesive or solvent bond to the top and bottom, respectively, of shroud 105. An opening through the top cap provides access for electrical communication with PCB 130, and an adhesive shrink tubing covers the opening and one or more cables extending therethrough, thereby isolating PCB 130 from exterior elements (e.g., moisture). A plurality of reed switches 131 (one shown in FIG. 4) are disposed on PCB 130, spaced vertically (into the page with respect to the view of FIG. 4). Further, a plurality of light emitting diodes (LEDs) 132 (one shown in FIG. 4) are disposed on PCB 130, horizontally offset with respect to shroud 105's cross-sectional (perpendicular to its elongation direction) line of symmetry and disposed sequentially on PCB 120 so that the LEDs are spaced vertically (into the page with respect to the view of FIG. 4) apart. Each LED 132 is in electrical communication with a respectively corresponding reed switch 131 so that PCB 130 has an equal number of reed switches 131 and LEDs 132 and so that each reed switch is coupled to one respective LED at approximately the same vertical location as the reed switch. Each LED has an intrinsic 180 degree viewing angle. In various embodiments, LEDs 132 may be single, dual, or multicolored, wherein the LED's color may indicate various messages or conditions. In a still further embodiment, each reed switch electrically communicates with multiple LEDs.

Because the LEDs have an intrinsic 180 degree viewing angle, absent the shroud, the LEDs are viewable in front of each LED's plane of emission in all directions within 2*pi steradians. The shape and material properties of shroud 105 enable visibility of visual indicator 100 along a wide solid angle that is greater than 2*pi steradians. More particularly, shroud 105 enables viewing of the LEDs for a viewing angle greater than 180 degrees, where the viewing angle is bisected by the center light-emission axis of each LED and rotated about that axis to thereby define the LED's viewing angle or area. In further embodiments, the viewing angle is greater than 190 degrees. In yet further embodiments, the viewing angle is greater than 260 degrees, and in still further embodiments, the viewing angle is greater than 270 degrees. When a ray of light reaches an interface between two materials having different indices of refraction, except for light incident at angles greater than the interface's angle of total internal reflection, a portion of light is reflected, while the rest of the light is refracted (i.e. transmitted but bent with respect to an axis normal to the interface at the point of incidence). In the illustrated embodiment, the polymer shroud 105 has an index of refraction that is greater than that of air. Thus, for light traveling within the polymer, at each interface with the air, a portion of the light emitted from the LEDs passes through the interface and into the air, while another portion of light is reflected back into the polymer. Ray 140 illustrates one path of light that enables visual indication beyond the intrinsic viewing angle of the LED (which, as should be understood, is a function of the LED's manufacture). In having a rounded profile (corresponding with outer edge 110), shroud 105 provides curved surface and, therefore, a continuum of reflection angles that concentrate reflection behind the LEDs' forward-facing plane of emission (i.e. for an LED oriented so that the LED's center light emission axis extends horizontally forward from the LED, a vertical plane, perpendicular to the axis and passing through the base of the LED). That is, the curved surface effectively acts as a curved mirror to concentrate light emitted from the LEDs behind the respective plane of emission for each LED, thereby increasing the brightness at certain focal points behind the LEDs' respective planes of emission. Further, the surface of shroud 105's outside face is not perfectly smooth. Thus, a portion of the light passing through it scatters in various directions. Therefore, light hitting the outside surface of shroud 105 is viewable from all unobstructed points in front of a series of planes tangential to the surface at each point at which light hits the surface. Because shroud 105's surface is cylindrically curved, some of the tangential planes will be disposed at a non-90° angle with respect to the LEDs' center light-emission axes (assuming an embodiment in which the LEDs are all aligned with respect to each other so that their light-emission axes are parallel to each other and in a common plane). In this way, light from the LEDs will be radiated from the shroud, and visible from unobstructed viewing positions, behind the emission planes of the LEDs. Further still, the curved surface does not have vertically-oriented edges associated with a rectangular profile that may obscure a direct line of sight to the LEDs. The shape of shroud 105, therefore, provides a visual indication over a continuous viewing angle that is greater than 180 degrees with respect to an axis parallel to the elongation direction of the elongated housing. In some embodiments, the viewing angle is greater than 190 degrees, and in further embodiments, the viewing angle is up to or greater than 270 degrees.

Figure 7:
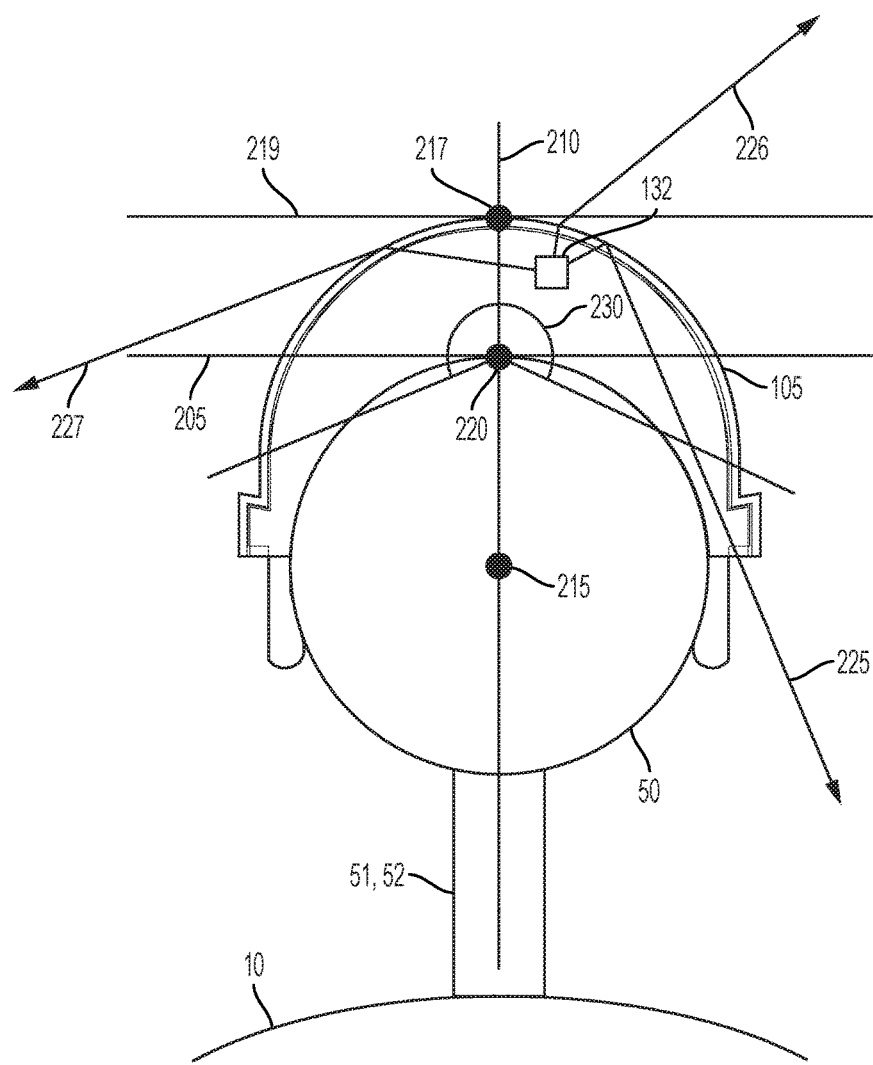
FIG. 7 is a top partial perspective view of the tank and liquid level indicator of FIG. 1 with reference geometry.

Referring also to FIG. 7, reference geometry is disclosed from a top partial perspective view of the liquid level indicator. Axis 215 extends into the page and illustrates a path along which float 80 travels. Since, in this embodiment, housing 50 is cylindrical, axis 215 is located at the center axis of the cylindrical housing. A first plane 205 is tangential to housing 50 opposite tank 10 with respect to axis 215 and parallel to axis 215. A second plane 210 is perpendicular to plane 205 and encompasses axis 215. Axis 220 is defined by the intersection between plane 205 and plane 210. In some embodiments, visual indicator 100 will be visible from all unobstructed positions in front of shroud 105 (upward from shroud 105, in the view of FIG. 7) within an area defined by the sweep of an angle 230 about axis 220 and bisected by plane 210. Due to the configuration of shroud 105 and the disposition of LEDs 132 within the shroud, light radiated from the LEDs through the shroud is radiated into the viewing area defined by angle 230. As indicated above, in certain embodiments, angle 230 is greater than 180 degrees or greater than 190 degrees, and in further embodiments, angle 230 may be up to or greater than 270 degrees. As also indicated in FIG. 7, light from the plurality of vertically aligned LEDs 132 (one of which is visible in FIG. 7) is visible from all unobstructed positions in front of shroud 105 (upward from shroud 105, in the view of FIG. 7) within an area defined by the sweep of an angle about an axis 217 at the intersection of plane 210 and the outer surface of shroud 105 that is bisected by plane 210. Again due to the configuration of shroud 105 and the disposition of LEDs 132 within the shroud, light radiated from the LEDs through the shroud is radiated into the viewing area defined by this angle. In certain embodiments, this angle is greater than 180 degrees or greater than 190 degrees, and in further embodiments, this angle may be up to or greater than 270 degrees or 300 degrees.

Ray 225 illustrates a path of light from LEDs 132 that is viewable via reflection by shroud 105 that passes through plane 205; ray 226 illustrates a path of light that is refracted by shroud 105 that travels away from plane 205; and ray 227 illustrates a path of light that passes through plane 205 via scattering at shroud 105's outer surface. As indicated in FIG. 7, light emitted by LEDs 132 and radiated through cover shroud 105 is radiated into an area that extends on both sides of plane 205 and that extends on both sides of a vertical plane 219 that is parallel to plane 205 and includes axis 217 (i.e. is tangential to the outer surface of shroud 105 at axis 217). It should be understood that while LEDs 132 are illustrated as being aligned vertically in the shroud along a common axis, that this is for purposes of example only, and that the LEDs may be disposed in different positions and orientations within the shroud. For example, the LEDs may be disposed alternatingly on opposite sides of plane 210.

Figure 5:
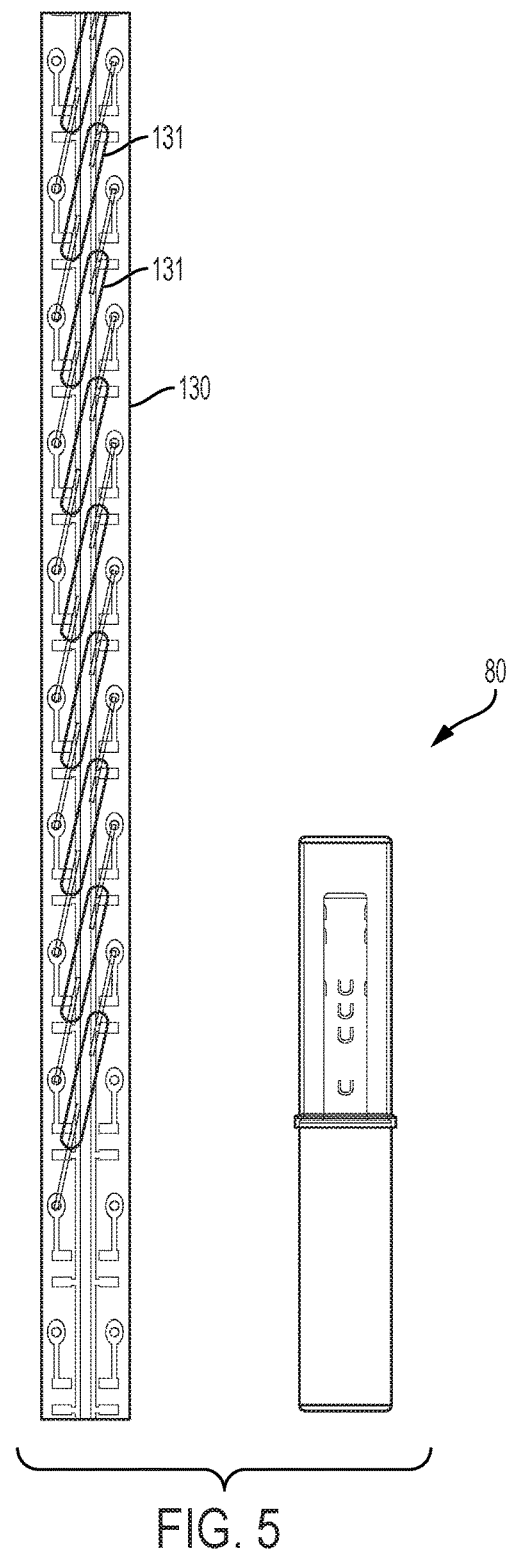
FIG. 5 is a partial view of an arrangement of reed switches for use in the liquid level indicator of FIG. 1.

Reed switches 131 are normally open, and each is configured with a magnetic member that moves under a magnetic field to close the switch and electrically connect a terminal on each side of the switch. Thus, when the magnet within float 80 (FIG. 1) is proximate to a reed switch, the reed switch closes, connecting a portion of a circuit. In the illustrated embodiment, when the switch closes, a circuit through a respective LED 132 is completed, and LED 132 illuminates, as further disclosed below. FIG. 5 illustrates an orientation of reed switches 131 on PCB 130 consistent with the present embodiment. Reed switches 131 are oriented vertically with respect to each other, in that a vertical axis passes through a center of each reed switch 131 so that the reed switches are aligned vertically with respect to each other. The center of each reed switch aligned vertically on an axis, and each reed switch 131 is spaced one-half inch from each adjacent reed switch's center. In the illustrated embodiment, the magnet having a predetermined field strength is selected in conjunction with the reed switches' sensitivity and a distance in the horizontal direction between the axis along which the magnet within the float travels and the axis upon which the reed switches are centered so that at any given location along the float's path, no fewer than one reed switch and no greater than two reed switches are closed. In the case where two reed switches are simultaneously closed, the two closed reed switches are adjacent to each other. In the illustrated embodiment, each reed switch 131 is sensitive to a magnet at a height within three-eighths of an inch of the height of the center of the reed switch. In order to optimize visual indicator 100's resolution, reed switches are attached to PCB 130 so that each reed switch 131's axis is parallel to PCB 130's surface but at an acute angle with respect to the vertical. In this way, while the length of each reed switch 131 is greater than one-half inch, the centers of each reed switch 131 are vertically spaced within one-half inch of the adjacent reed switches' centers. In further embodiments, the reed switch spacing may vary.

Figure 6:
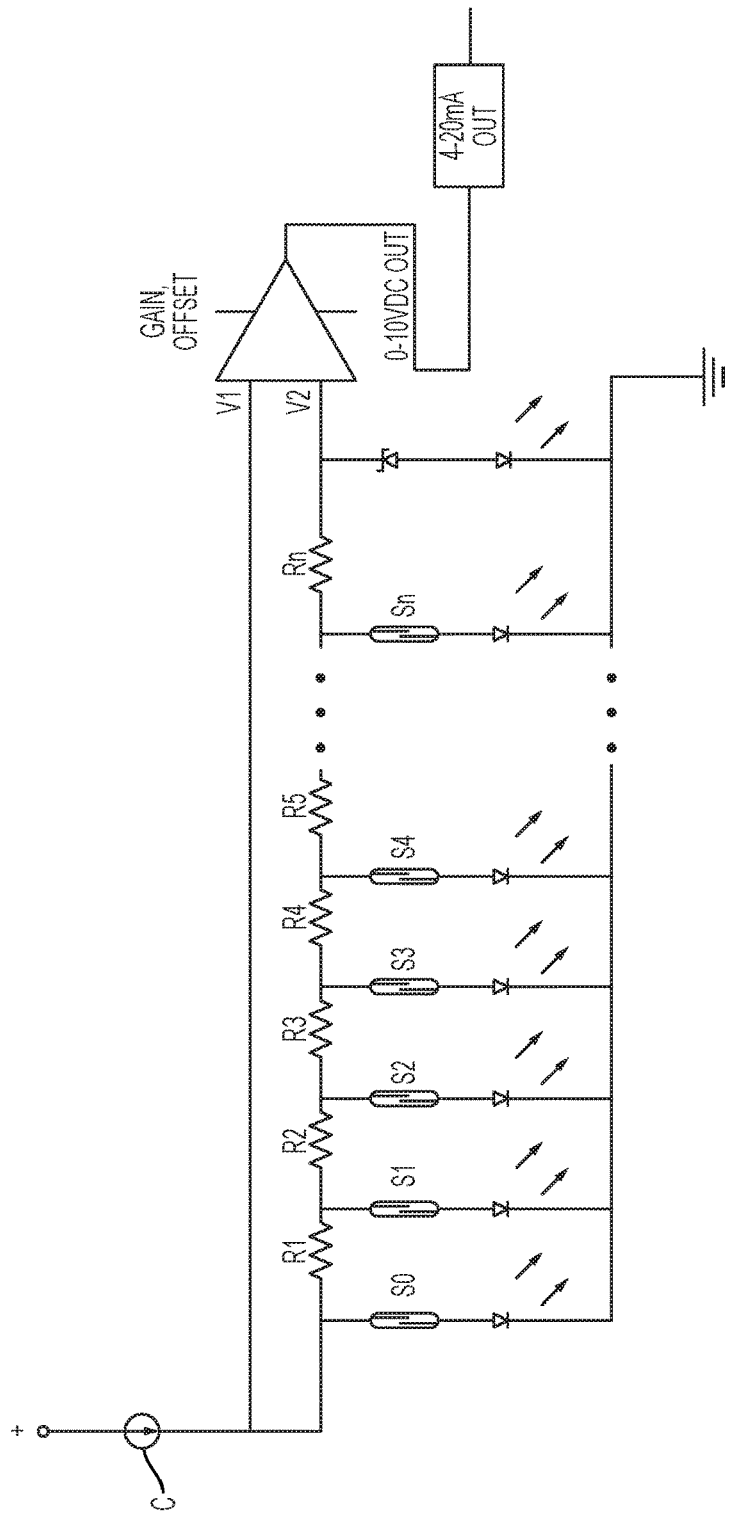
FIG. 6 is a diagram of an electrical circuit for use in the liquid level indicator of FIG. 1.

FIG. 6 illustrates a simplified circuit diagram consistent with embodiments of the present disclosure. An 18 mA current source C passes into a plurality of reed switches. Each reed switch is in series with a diode so that if the reed switch closes, the diode receives current and is illuminated. Further, each reed switch is electrically spaced from adjacent reed switches by a series of resistors R1 through Rn. In this way, an output signal may be generated that varies based on the reed switch that is closed. For example, if reed switch S0 is the only closed switch, the voltage V2 into the op amp is the cumulative voltage drop across each resistor R1 through Rn before entering the op amp; if reed switch S3 is the only closed reed switch, the voltage applied to the op amp is the cumulative voltage drop across each resistor R4 through Rn. Thus, the voltage V2 into the op amp varies by which reed switch or switches are closed. Further, the current divide between path P1 and P2 varies depending on which reed switch or switches are closed. In this way, the op amp, acting as a differential amplifier, outputs a different voltage depending on which reed switch or switches are closed. By adding a gain and offset to the output, the output voltage is scaled from 0-10V. The voltage output from the op amp then passes through a signal converter to provide a 4-20 mA output, wherein 4 mA corresponds to S0 being the only closed switch and 20 mA corresponds to Sn being the only closed switch, or vice versa. Generally, the output changes linearly as each consecutive reed switch is closed. However, slight fluctuations in linearity may occur when two reed switches are simultaneously closed. A Zener diode is in series with a fault LED (e.g., a blue LED) so that when no switches are closed, the voltage across the Zener diode overcomes the Zener diode's critical reverse voltage, thereby illuminating the fault LED and indicating a lack of a detectable magnetic field within housing 50. An additional hanging resistor will provide a signal in excess of 20 mA. In yet further embodiments, a pair of upper and lower LEDs are included in the circuit that are not in series with reed switches (i.e. always illuminated) and disposed at the top and the bottom, respectively, of PCB 130, thereby providing an indication of a relative position of the visual indicator's upper and lower limits. That is, the top and bottom LEDs are always lit and not in series with reed switches to provide reference points for the upper and lower extremes of the visual indicator.

Referring again to FIG. 2, a junction box 180 mounts proximate to the visual indicator 100. Junction box 180 provides a location for connecting wires for providing power to PCB 130 (FIG. 4) from a power source (not shown) for powering the op amp, LEDs, and other circuitry, and providing the current source. Further, as stated above, visual indicator 100 outputs a 4-20 mA signal depending on which reed switch or switches 131 are closed. For example, the output signal may be 4 mA when the lowest reed switch is closed and incrementally increases linearly to 20 mA when the highest reed switch is closed. Thus, the output signal indicates how full the tank is along visual indicator 100. In various other configurations, the output signal may be configured to provide a varying voltage or resistance depending on the float height. The output signal is provided to junction box 180 via cable 181, which may connect within junction box 180 to a cable that terminates at, for example, a monitor, controller, or process valve. In this way, in addition to providing a visual LED indication, visual indicator 180 provides an electrical signal indicating the fluid level in the tank. Wire 181 terminates at a plug (not shown) that clips to a receiving portion on PCB 130, thereby enabling easy coupling and decoupling. In further embodiments, the controller may provide an alarm when the fluid level reaches a high or low level set point.

Various features may be included in visual indicator 100. For example, a fault LED or audible alarm may indicate the absence of a magnetic field, which may be activated, for example, if the float is damaged or removed from housing 50.

The disclosed embodiments provide various improvements over the prior art. For example, conventional flag/magnet indicators can be seen only straight on and close up, and cannot be seen in the dark. The disclosed embodiments can be seen in the dark and from a distance. Further, by providing a wide-angle visual indication, the disclosed embodiments provide users with tank level indication from a greater number of vantage points. Thus, the disclosed visual indicator provides users with tank level information in situations where viewing the fluid level indicator from certain angles is difficult, for example, in tightly packed rooms. Users may, therefore, more easily, quickly, and efficiently determine the level of the liquid. In certain situations, the user may respond to the indicated liquid level by, for example, turning on or shutting off pumps.

While one or more preferred embodiments of the invention are described above, it should be appreciated by those skilled in the art that various modifications and variations can be made in the present invention without departing from the scope and spirit thereof. For example, Hall effect sensors may be substituted for the reed switches. As another example, in a further embodiment, the tank may have two liquids between which the float is suspended. In yet further embodiments, the visual indicator may be used with non-liquid fluids. Further, while certain geometries are shown, various other geometries are consistent with embodiments of the present disclosure. Additionally, many exemplary materials are presented, yet various substitutions can be made. For instance, many sheet metal parts may be replaced with machined parts. Moreover, while the disclosure uses the term "tank" to refer to a vessel holding a liquid, it should be understood that the term "tank" should include all vessels capable of holding a fluid.

Accordingly, it should be understood that the elements of one embodiment may be combined with another embodiment to create a still further embodiment. It is intended that the present invention cover such modifications and variations as come within the scope and spirit of the present disclosure, the appended claims, and their equivalents.

What is claimed is:

1. A tank and liquid level indicator comprising:
a first housing enclosing a first volume that holds a liquid;
a second elongated housing enclosing a second volume, wherein the second housing is attached to an exterior of the first housing so that the second volume is in fluid communication with the first volume so that a level of the liquid within the second volume is approximately equal to a level of the liquid in the first volume;
a float disposed within the second volume and being buoyant with respect to the liquid so that the float moves with the level of the liquid in the second volume along a first axis passing through a center of the float, wherein at least a portion of the float is magnetic so that a magnetic field extends from the float;
a plurality of magnetic sensors aligned sequentially with respect to each other in a direction having a vertical component, wherein the magnetic sensors are disposed with respect to the second volume so that movement of the float within the second volume in response to the level of the liquid within the second volume causes sequential detection of the magnetic field by respective said magnetic sensors of the plurality of sensors;
at least one light source in electrical communication with the plurality of magnetic sensors so that the magnetic sensors control actuation of the at least one light source in response to the detection of the magnetic field; and
a light-transmissive cover attached to the second housing so that the at least one light source is disposed between the second housing and an outer surface of the light-transmissive cover, wherein the outer surface is disposed on at least one side of a first plane that is parallel to the first axis and at an outer surface of the second housing and is disposed on an opposite side of the first axis from the first housing,
wherein the at least one light source is disposed with respect to the outer surface of the cover so that a first portion of light from the at least one light source passes through the first plane and a second portion of the light from the light source travels away from the first plane.

2. The tank and liquid level sensor of claim 1, wherein the outer surface of the cover extends across and beyond both sides of the first plane.

3. The tank and liquid level indicator of claim 1, wherein the at least one light source comprises a plurality of light sources.

4. The tank and liquid level indicator of claim 3, wherein each said at least one light source connects to at least one sensor of the plurality of sensors, wherein the at least one sensor is in electrical communication with said at least one light source and a power source so that actuation of the at least one sensor by the magnetic field delivers current from the power source to actuate the at least one light source.

5. The tank and liquid level indicator of claim 1, wherein the at least one light source is viewable from an angle that is greater than 180 degrees, wherein the angle is defined as an angle swept about a second axis, defined by an intersection between the first plane and a second plane that is perpendicular to the first plane and upon which the first axis lies, and wherein the angle is bisected by the second plane.

6. The tank and liquid level indicator of claim 5, wherein the angle is greater than 270 degrees.

7. The tank and liquid level indicator of claim 1, wherein the liquid level indicator further provides an electrical output corresponding with the liquid level, wherein the electrical output is one of a current, a voltage, and a resistance.

8. The tank and liquid level indicator of claim 1, wherein the indicator is further configured to provide an output signal, wherein the output signal is determined by the detection of the magnetic field.

9. The tank and liquid level indicator of claim 1, wherein the magnetic sensors have an elongation direction, a center point of sensitivity, and a length, and wherein the magnetic sensors' elongation directions are nonparallel to the second housing's elongation direction and the magnetic sensors are spaced so that a distance between each magnetic sensor's center point of sensitivity and each adjacent' magnetic sensor's center point of sensitivity is less than each magnetic sensor's length.

10. The tank and liquid level indicator of claim 1, wherein the magnetic sensors are reed switches.

11. The tank and liquid level indicator of claim 1, wherein the light-transmissive cover is removably attachable to the second housing.

12. The tank and liquid level indicator of claim 11, wherein the light-transmissive cover attaches to the second housing via a clip.

13. The tank and liquid level indicator of claim 12, wherein the clip is a portion of the light-transmissive cover.

14. The tank and liquid level indicator of claim 1, wherein the magnetic sensors each have a center of sensitivity, and each magnetic sensor's center of sensitivity is spaced by no more than one-half inch from the adjacent magnetic sensors' centers of sensitivity in the second housing's elongation direction.

15. The tank and liquid level indicator of claim 1, wherein the at least one light source comprises a plurality of LEDs, wherein at least one LED is in electrical communication with each magnetic sensor.

16. The tank and liquid level indicator of claim 15, wherein a portion of light from the plurality of LEDs is reflected and another portion of the light from the plurality of LEDs is transmitted.

17. The tank and liquid level indicator of claim 15, wherein reflection within the light-transmissive cover causes the plurality of LEDs to be viewable from the angle greater than 180 degrees.

18. The tank and liquid level indicator of claim 1, wherein the magnetic sensors are spaced with respect to each other and spaced from the float so that a condition is true, wherein the condition is selected from the group of: one magnetic sensor detecting the magnetic field and two adjacent magnetic sensors detecting the magnetic field.

19. The tank and liquid level indicator of claim 18, wherein the float comprises a plurality of vertically-spaced slots for receiving the magnet.

20. The tank and liquid level indicator of claim 1, wherein the float comprises a magnet selectively spaced in the vertical direction with respect to a bottom of the float so that the magnet is at the level of liquid in the second volume when the float is floating on the liquid.

21. A tank and liquid level indicator comprising:
a first housing enclosing a first volume that holds a liquid;
a second generally cylindrical housing having annular cross-sections and enclosing a second volume, wherein the second housing is attached to an exterior of the first housing so that the second volume is in fluid communication with the first volume so that a level of the liquid within the second volume is approximately equal to a level of the liquid in the first volume;

a generally cylindrical float disposed within the second volume and being buoyant with respect to the liquid so that the float moves with the level of the liquid in the second volume along a first axis passing through a center of the float, wherein at least a portion of the float is magnetic so that a magnetic field extends from the float;

a plurality of magnetic sensors aligned sequentially with respect to each other in a direction having a vertical component, wherein the magnetic sensors are disposed with respect to the second volume so that movement of the float within the second volume in response to the level of the liquid within the second volume causes sequential detection of the magnetic field by respective said magnetic sensors of the plurality of sensors;

at least one light source in electrical communication with the plurality of magnetic sensors so that the magnetic sensors control actuation of the at least one light source in response to the detection of the magnetic field; and a light-transmissive cover attached to the second housing so that the at least one light source is disposed between the second housing and an outer surface of the light-transmissive cover, wherein the outer surface extends across and beyond both sides of a first plane that is parallel to the first axis and tangential to an outer surface of the second housing, and the at least one light source is disposed on an opposite side of the first axis from the first housing, wherein the at least one light source is disposed with respect to the outer surface of the cover so that light from the at least one light source passes through the first plane and away from the first plane.

* * * * *